United States Patent
Effler et al.

(10) Patent No.: US 9,908,956 B2
(45) Date of Patent: *Mar. 6, 2018

(54) PROCESS TO PRODUCE ENHANCED MELT STRENGTH ETHYLENE/ALPHA-OLEFIN COPOLYMERS AND ARTICLES THEREOF

(71) Applicant: Dow Global Technologies LLC, Midland, MI (US)

(72) Inventors: Lawrence J. Effler, Rosharon, TX (US); Teresa P. Karjala, Lake Jackson, TX (US); Mehmet Demirors, Pearland, TX (US); Nilesh R. Savargaonkar, Pearland, TX (US); Selim Bensason, Au/ZH (CH); Zhe Zhou, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,473

(22) Filed: Jul. 21, 2016

(65) Prior Publication Data

US 2016/0326283 A1  Nov. 10, 2016

Related U.S. Application Data

(62) Division of application No. 14/001,209, filed as application No. PCT/US2012/027312 on Mar. 1, 2012, now Pat. No. 9,428,636.

(Continued)

(51) Int. Cl.
 C08F 2/06    (2006.01)
 C08F 210/16  (2006.01)
(Continued)

(52) U.S. Cl.
 CPC ............ C08F 210/16 (2013.01); C08F 10/02 (2013.01); C08J 3/201 (2013.01); C08J 5/18 (2013.01);
(Continued)

(58) Field of Classification Search
 None
 See application file for complete search history.

(56) References Cited

U.S. PATENT DOCUMENTS 4,508,844 A  4/1985 Agapiou
4,762,898 A  8/1988 Matsuura et al.
(Continued)

FOREIGN PATENT DOCUMENTS

CA  703704 A    2/1965
EP  126515 A1  11/1984
(Continued)

OTHER PUBLICATIONS

Nova Chemicals, "SCLAIR polyethylene Product Data Sheet FP120-C", Jun. 7, 2004.*

(Continued)

*Primary Examiner* — Richard A Huhn
(74) *Attorney, Agent, or Firm* — Dinsmore & Shohl LLP

(57) ABSTRACT

An ethylene/α-olefin copolymer comprising units derived from ethylene; and units derived from at least one α-olefin; wherein the ethylene/α-olefin copolymer has a density in the range of from 0.90 to 0.94 g/cc; a melt index ($I_2$) in the range of from 0.05 to 50 dg/min; an Mw/Mn of from 3 to 5; and from 300 to 500 vinyl unsaturations per 1,000,000 carbon atoms in the ethylene/α-olefin copolymer is provided. Also provided is a process for producing an ethylene/α-olefin copolymer comprising: (1) polymerizing ethylene and one or more α-olefins in a polymerization reactor; (2) thereby producing an enhanced melt strength ethylene/α-olefin (Continued)

copolymer having from 300 to 500 vinyl unsaturation units per 1,000,000 carbon atoms, a density in the range of from 0.90 to 0.94 g/cc; a melt index ($I_2$) in the range of from 0.05 to 50 dg/min; and a Mw/Mn of from 3 to 5.

5 Claims, 1 Drawing Sheet

Related U.S. Application Data

(60) Provisional application No. 61/468,467, filed on Mar. 28, 2011.

(51) Int. Cl.

| | |
|---|---|
| *C08L 23/20* | (2006.01) |
| *C08J 3/20* | (2006.01) |
| *C08J 5/18* | (2006.01) |
| *C08L 23/08* | (2006.01) |
| *C08K 5/524* | (2006.01) |
| *C08F 10/02* | (2006.01) |
| *C08L 23/06* | (2006.01) |
| *C08K 5/134* | (2006.01) |
| *C08K 5/52* | (2006.01) |

(52) U.S. Cl.
CPC ............. *C08K 5/134* (2013.01); *C08K 5/52* (2013.01); *C08K 5/524* (2013.01); *C08L 23/06* (2013.01); *C08L 23/08* (2013.01); *C08L 23/0815* (2013.01); *C08F 2/06* (2013.01); *C08J 2323/06* (2013.01); *C08J 2323/08* (2013.01); *C08L 23/20* (2013.01)

(56) References Cited

U.S. PATENT DOCUMENTS

| | | | |
|---|---|---|---|
| 5,508,364 | A | 4/1996 | Sasaki et al. |
| 5,519,098 | A | 5/1996 | Brown et al. |
| 6,114,457 | A | 9/2000 | Markel et al. |
| 6,121,396 | A | 9/2000 | Sone et al. |
| 9,428,636 | B2 * | 8/2016 | Effler ................ C08F 210/16 |
| 2008/0248228 | A1 | 10/2008 | Aubee et al. |
| 2009/0047490 | A1 | 2/2009 | Scully et al. |
| 2012/0283390 | A1 * | 11/2012 | Demirors ............... C08J 5/18 |
| | | | 525/194 |

FOREIGN PATENT DOCUMENTS

| | | |
|---|---|---|
| JP | S64-069609 | 3/1981 |
| JP | S59-174603 | 3/1984 |
| JP | H03-197515 | 8/1991 |
| JP | H08-225607 | 3/1996 |
| WO | 0162808 A1 | 8/2001 |
| WO | 02074817 A2 | 9/2002 |
| WO | 2008124557 A1 | 10/2008 |
| WO | 2011019563 A1 | 2/2011 |
| WO | 2011085379 A1 | 7/2011 |

OTHER PUBLICATIONS

Chinese Response to Office Action dated Oct. 5, 2016; from Chinese counterpart Application No. 201180015925.2.
IPRP dated Oct. 1, 2013; from EP counterpart application No. PCTUS2012027312.
EP Office action dated Nov. 6, 2013; from EP counterpart Application No. 12711051.8.
Response to EPO Office Action dated Jul. 17, 2014 for counterpart European Application No. 12711051.8, 4 pages.
Response to Singapore Written Opinion dated Sep. 8, 2014 for counterpart Singapore Application No. 201306906-7, 7 pages.
Instructions to EP office Action dated Apr. 7, 2014, from EP counterpart Application No. 12711051.8.
Saudi Arabia Office action dated Jul. 2, 2014; from SA counterpart Application No. 112330356.
Instructions to Saudi Arabia Office Action dated Aug. 4, 2014; from SA counterpart Application No. 112330356.
EP Office Action dated Jul. 17, 2014; from EP counterpart Application No. 12711051.8.
Saudi Arabia Second Examination Report dated Jul. 27, 2015 for counterpart Saudi Arabian Application No. 112330356, 4 pages.
Chinese First Office Action dated Apr. 30, 2015 for counterpart Chinese Application No. 201280015925.2, 9 pages.
Singapore Office Action dated Sep. 12, 2014; from Singapore counterpart Application No. 201306906-7.
Chinese Response to Office Action dated Nov. 15, 2015; from Chinese counterpart Application No. 201180015925.5.
Japanese Office Action dated Feb. 29, 2016; from Japanese counterpart Application No. 2014-502579.
Chinese office Action dated Feb. 4, 2016; from Chinese counterpart Application No. 201280015925.2.
Nova chemicals, "SCLAIR polyethylene", Publication date: Jun. 7, 2004 (p. 2, bottom left), Nova chemicals, pp. 1-2.
Search Report & Written Opinion pertaining to International Application No. PCT/US2012/027312 dated Nov. 28, 2012.
International Preliminary Report on Patentability pertaining to International Application No. PCT/US2012/027312 dated Oct. 10, 2013.
European Search Report for Application No. 17157437.9 dated May 26, 2017.

* cited by examiner

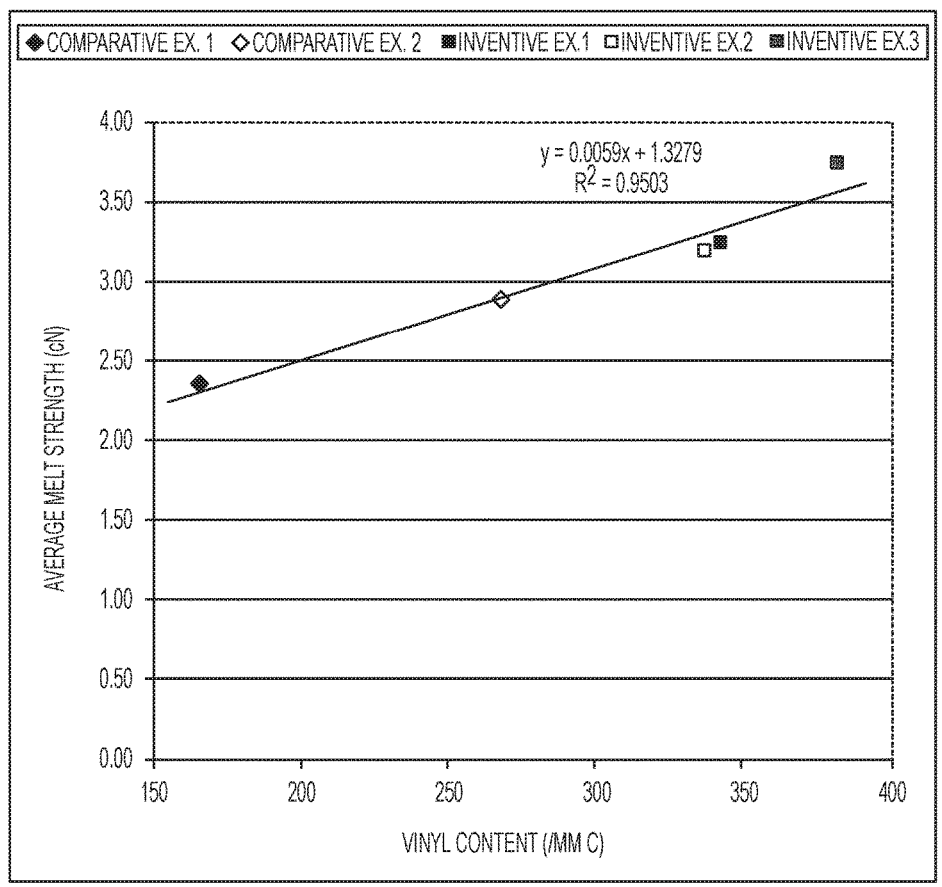

PROCESS TO PRODUCE ENHANCED MELT STRENGTH ETHYLENE/ALPHA-OLEFIN COPOLYMERS AND ARTICLES THEREOF

This application is a divisional of U.S. application Ser. No. 14/001,209, filed on Aug. 23, 2013, which claims priority to PCT Application No. PCT/US2012/027312, filed on Mar. 1, 2012; which claims priority to U.S. Provisional Application Ser. No. 61/468,467, filed on Mar. 28, 2011, the disclosures of which are incorporated herein by reference.

FIELD OF INVENTION

The instant invention relates to a process to produce enhanced melt strength ethylene/α-olefin copolymers and articles thereof.

BACKGROUND OF THE INVENTION

Enhanced melt strength ethylene-based copolymers are useful in a variety of applications, such as those requiring film strength during thermoforming or to increase production rates in processing. The melt strength of such ethylene/α-olefin copolymers may be improved by lightly cross-linking the ethylene/α-olefin copolymer using cross-linking agents such as peroxides, azide and silane coupling agents. In the alternative, the melt strength of such ethylene/α-olefin copolymers may be improved through oxygen tailoring of the resin. Or in the alternative, the melt strength of such ethylene/α-olefin copolymers may be improved through the incorporation of long chain branching in the copolymer backbone. Each of these methods tends to increase the costs of copolymer production.

SUMMARY OF THE INVENTION

The instant invention provides ethylene/α-olefin copolymers, a process to produce ethylene/α-olefin copolymers, blends thereof and films made therefrom.

In one embodiment, the instant invention provides an ethylene/α-olefin copolymer comprising: units derived from ethylene; and units derived from at least one α-olefin; wherein the ethylene/α-olefin copolymer has a density in the range of from 0.90 to 0.94 g/cc; a melt index ($I_2$) in the range of from 0.05 to 50 dg/min; an Mw/Mn of from 3 to 5; and from 300 to 500 vinyl unsaturations per 1,000,000 carbon atoms in the ethylene/α-olefin copolymer.

In another alternative embodiment, the instant invention further provides a process for producing an ethylene/α-olefin copolymer comprising the steps of: (1) polymerizing ethylene and one or more α-olefins in a polymerization reactor; (2) thereby producing an enhanced melt strength ethylene/α-olefin copolymer having from 300 to 500 vinyl unsaturation units per 1,000,000 carbon atoms, a density in the range of from 0.90 to 0.94 g/cc; a melt index ($I_2$) in the range of from 0.05 to 50 dg/min; and a Mw/Mn of from 3 to 5.

In an alternative embodiment, the instant invention provides an ethylene/α-olefin copolymer and a process for producing an ethylene/α-olefin copolymer in accordance with any of the preceding embodiments, except that the polymerization step occurs in the presence of hydrogen from 0.01 to 0.04 mole percent.

In an alternative embodiment, the instant invention provides an ethylene/α-olefin copolymer and a process for producing an ethylene/α-olefin copolymer in accordance with any of the preceding embodiments, except that the polymerization step occurs in the presence of hydrogen from 0.015 to 0.03 mole percent.

In an alternative embodiment, the instant invention provides an ethylene/α-olefin copolymer and a process for producing an ethylene/α-olefin copolymer in accordance with any of the preceding embodiments, except that the polymerization step occurs at a temperature from 205 to 240° C.

In an alternative embodiment, the instant invention provides an ethylene/α-olefin copolymer and a process for producing an ethylene/α-olefin copolymer in accordance with any of the preceding embodiments, except that the polymerizing step occurs at a temperature from 205 to 215° C.

In an alternative embodiment, the instant invention provides an ethylene/α-olefin copolymer and a process for producing an ethylene/α-olefin copolymer in accordance with any of the preceding embodiments, except that the polymerizing step occurs in a single stage solution reactor.

In an alternative embodiment, the instant invention provides an ethylene/α-olefin copolymer and a process for producing an ethylene/α-olefin copolymer in accordance with any of the preceding embodiments, except that a primary antioxidant is added to a product stream produced in the polymerizing step postreactor.

In an alternative embodiment, the instant invention provides an ethylene/α-olefin copolymer and a process for producing an ethylene/α-olefin copolymer in accordance with any of the preceding embodiments, except that a secondary antioxidant is added to the product stream produced in the polymerizing step postreactor.

In an alternative embodiment, the instant invention provides an ethylene/α-olefin copolymer and a process for producing an ethylene/α-olefin copolymer in accordance with any of the preceding embodiments, except that the secondary antioxidant is a phosphite.

In an alternative embodiment, the instant invention provides an ethylene/α-olefin copolymer and a process for producing an ethylene/α-olefin copolymer in accordance with any of the preceding embodiments, except that the ethylene/α-olefin copolymer has a melt strength of at least 3.0 cN.

In another alternative embodiment, the instant invention further provides a blend comprising the enhanced melt strength ethylene/α-olefin copolymer according to any one of the preceding embodiments and a second polymer selected from the group consisting of synthetic and natural polymers.

In another alternative embodiment, the instant invention provides a blend according to any one of the preceding embodiments except that the second polymer is LDPE.

In another alternative embodiment, the instant invention further provides a film comprising the enhanced melt strength ethylene/α-olefin copolymer or blend according to any one of the preceding embodiments.

In an alternative embodiment, the instant invention provides an ethylene/α-olefin copolymer, a process for producing an ethylene/α-olefin copolymer, blend and film in accordance with any of the preceding embodiments, except that the ethylene/α-olefin copolymer has from 330 to 400 vinyl unsaturation units per 1,000,000 carbon atoms.

In an alternative embodiment, the instant invention provides an ethylene/α-olefin copolymer, a process for producing an ethylene/α-olefin copolymer, blend and film in accordance with any of the preceding embodiments, except that the enhanced melt strength ethylene/α-olefin copolymers has a density of at least 0.915 g/cc.

In an alternative embodiment, the instant invention provides an ethylene/α-olefin copolymer, a process for producing an ethylene/α-olefin copolymer, blend and film in accordance with any of the preceding embodiments, except that the one or more α-olefins are selected from the group consisting of $C_3$ to $C_{20}$ α-olefins.

BRIEF DESCRIPTION OF THE DRAWINGS

For the purpose of illustrating the invention, there is shown in the drawings a form that is exemplary; it being understood, however, that this invention is not limited to the precise arrangements and illustrations shown.

FIG. 1 is a graph illustrating the average melt strength in cN versus the amount of vinyl unsaturation units per 1,000,000 carbon atoms and includes diamond data points for each of Inventive Examples 1, 2 and 3 and Comparative Examples 1 and 2, wherein Comparative Example 1 is shown by the solid diamond, Comparative Example 2 by the open diamond, Inventive Example 1 by the small solid square, Inventive Example 2 by the open square and Inventive Example 3 by the large solid square.

DETAILED DESCRIPTION OF THE INVENTION

The instant invention provides an ethylene/α-olefin copolymer, a process for producing an ethylene/α-olefin copolymer, a blend comprising the ethylene/α-olefin copolymer, and films made from such copolymers or blends.

The ethylene/α-olefin copolymer according to the present invention comprises: units derived from ethylene; and units derived from at least one α-olefin; wherein the ethylene/α-olefin copolymer has a density in the range of from 0.90 to 0.94 g/cc; a melt index (I2) in the range of from 0.05 to 50 dg/min; an Mw/Mn of from 3 to 5; and from 300 to 500 vinyl unsaturations per 1,000,000 carbon atoms in the ethylene/α-olefin copolymer.

All individual values and subranges from 0.90 to 0.94 g/cc density are included herein and disclosed herein; for example, the density of the ethylene/α-olefin copolymer can be from a lower limit of 0.90, 0.91, 0.92, or 0.93 g/cc to an upper limit of 0.91, 0.92, 0.93 or 0.94 g/cc. For example, the density of the ethylene/α-olefin copolymer may be in the range of from 0.90 to 0.94 g/cc, or in the alternative, the density of the ethylene/α-olefin copolymer may be in the range of from 0.91 to 0.93 g/cc, or in the alternative, the density of the ethylene/α-olefin copolymer may be in the range of from 0.91 to 0.92 g/cc.

All individual values and subranges from 0.05 to 50 g/10min melt index (I2) are included herein and disclosed herein; for example, the melt index ($I_2$) of the ethylene/α-olefin copolymer can be from a lower limit of 0.05, 0.1, 5, 15, 25, 35 or 45 g/10min to an upper limit of 0.0.1, 0.5, 10, 20, 30, 40 or 50 g/10 min. For example, the melt index ($I_2$) of the ethylene/α-olefin copolymer may be in the range of from 0.05 to 50 g/10 min, or in the alternative, the melt index ($I_2$) of the ethylene/α-olefin copolymer may be in the range of from 0.5 to 10 g/10 min, or in the alternative, the melt index ($I_2$) of the ethylene/α-olefin copolymer may be in the range of from 0.75 to 3 g/10 min.

All individual values and subranges from 3 to 5 Mw/Mn are included herein and disclosed herein; for example, the Mw/Mn of the ethylene/α-olefin copolymer can be from a lower limit of 3, 3.5, 4, or 4.5 to an upper limit of 3.5, 4, 4.5 or 5. For example, the Mw/Mn of the ethylene/α-olefin copolymer may be in the range of from 3 to 5, or in the alternative, the Mw/Mn of the ethylene/α-olefin copolymer may be in the range of from 3.5 to 4.5, or in the alternative, the Mw/Mn of the ethylene/α-olefin copolymer may be in the range of from 3.7 to 4.4

All individual values and subranges from 300 to 500 vinyl unsaturations per 1,000,000 carbon atoms in the ethylene/α-olefin copolymer are included herein and disclosed herein; for example, the vinyl unsaturation content of the ethylene/α-olefin copolymer can be from a lower limit of 300, 350, 400 or 450 vinyl unsaturations per 1,000,000 carbon atoms to an upper limit of 350, 400, 450 or 500 vinyl unsaturations per 1,000,000 carbon atoms. For example, the vinyl unsaturation content of the ethylene/α-olefin copolymer may be in the range of from 300 to 500 vinyl unsaturations per 1,000,000 carbon atoms, or in the alternative, the vinyl unsaturation content of the ethylene/α-olefin copolymer may be in the range of from 325 to 450 vinyl unsaturations per 1,000,000 carbon atoms, or in the alternative, the vinyl unsaturation content of the ethylene/α-olefin copolymer may be in the range of from 330 to 400 vinyl unsaturations per 1,000,000 carbon atoms.

In another embodiment, the invention provides any of the foregoing embodiments of the ethylene/α-olefin copolymer, wherein the melt strength of the ethylene/α-olefin copolymer satisfies the relationship, y≥0.004x+1.515, where x is the amount of vinyl unsaturations of the ethylene/α-olefin copolymer and y is the melt strength of the ethylene/α-olefin copolymer.

In another aspect, the invention provides a process for producing an inventive ethylene/α-olefin copolymer comprising the steps of: (1) polymerizing ethylene and one or more α-olefins in a polymerization reactor; (2) thereby producing an enhanced melt strength ethylene/α-olefin copolymer having from 300 to 500 vinyl unsaturation units per 1,000,000 carbon atoms, a density in the range of from 0.90 to 0.94 g/cc; a melt index ($I_2$) in the range of from 0.05 to 50 dg/min; and a Mw/Mn of from 3 to 5.

In some embodiments of the inventive process, the polymerization step occurs in the presence of hydrogen level from 0.01 to 0.04 mole percent. All values and subranges from 0.01 to 0.04 mole percent hydrogen are included herein and disclosed herein; for example, the mole percent hydrogen in the polymerization reactor can be from a lower limit of 0.01, 0.015, 0.02, or 0.025 mole percent to an upper limit of 0.015, 0.02, 0.025 or 0.03 mole percent. For example, the reactor hydrogen content may be in the range of from 0.01 to 0.04 mole percent, or in the alternative, the reactor hydrogen content may be in the range of from 0.02 to 0.03 mole percent.

In some embodiments, the polymerizing step occurs at a temperature from 205 to 240° C. All individual values and subranges from 205 to 240° C. are included herein and disclosed herein; for example, the polymerizing step can be at a temperature from a lower limit of 205, 210, 215, 220, 225, 230, or 235° C. to an upper limit 210, 215, 220, 225, 230, 235, or 240° C. For example, the polymerizing step may be at a temperature in the range of from 205 to 240° C., or in the alternative, the polymerizing step may be at a temperature in the range of from 205 to 230° C., or in the alternative, the polymerizing step may be at a temperature in the range of from 205 to 220° C., or in the alternative, the polymerizing step may be at a temperature in the range of from 205 to 215° C.

In some embodiments, the inventive ethylene/α-olefin copolymer has a melt strength improved by at least 10% relative to an ethylene/α-olefin copolymer having substantially the same ethylene/α-olefin content and $I_2$ of the enhanced melt strength ethylene/α-olefin copolymer but produced in a temperature in the range of less than 205° C. and having less than 300 vinyl unsaturation units per 1,000,000 carbon atoms. All individual values and subranges from at least 10% improvement in melt strength are included herein and disclosed herein. For example, the improvement in melt strength of the enhanced melt strength ethylene/α-olefin copolymer produced by the inventive process relative to that produced from a non-inventive process can be at least 10%, or in the alternative, the improvement in melt strength of the enhanced melt strength ethylene/α-olefin copolymer can be at least 11%, or in the alternative, the improvement in melt strength of the enhanced melt strength ethylene/α-olefin copolymer can be at least 12%, or in the alternative, the improvement in melt strength of the enhanced melt strength ethylene/α-olefin copolymer can be at least 13%, or in the alternative, the improvement in melt strength of the enhanced melt strength ethylene/α-olefin copolymer can be at least 14%, or in the alternative, the improvement in melt strength of the enhanced melt strength ethylene/α-olefin copolymer can be at least 15%, or in the alternative, the improvement in melt strength of the enhanced melt strength ethylene/α-olefin copolymer can be at least 17%, or in the alternative, the improvement in melt strength of the enhanced melt strength ethylene/α-olefin copolymer can be at least 19%.

Any conventional polymerization processes may be employed in the inventive process. Such conventional polymerization processes include, but are not limited to, solution polymerization process, gas phase polymerization process, slurry phase polymerization process, and combinations thereof using one or more conventional reactors e.g. loop reactors, isothermal reactors, fluidized bed gas phase reactors, stirred tank reactors, batch reactors in parallel, series, and/or any combinations thereof.

The inventive process may, for example, utilize a solution-phase polymerization process using one or more loop reactors, isothermal reactors, and combinations thereof.

In general, the inventive process may utilize a solution phase polymerization process occurring in one or more well-stirred reactors such as one or more loop reactors or one or more spherical isothermal reactors at a temperature in the range of from at least 205° C., for example, from 205 to 300° C., and at pressures in the range of from 300 to 1000 psi; for example, from 400 to 750 psi. The residence time in solution phase polymerization process is typically in the range of from 2 to 30 minutes; for example, from 10 to 20 minutes. Ethylene, solvent, multi-constituent catalyst composition, and optionally one or more comonomers are fed continuously to the reactor. Exemplary multi-constituent catalyst compositions in these embodiments include, for example, Ziegler-Natta catalysts, as described herein. Exemplary solvents include, but are not limited to, isoparaffins. For example, such solvents are commercially available under the name ISOPAR E from ExxonMobil Chemical Co., Houston, Tex. The resultant mixture of the inventive ethylene/α-olefin copolymer and solvent is then removed from the reactor and the inventive ethylene/α-olefin copolymer is isolated. Solvent is typically recovered via a solvent recovery unit, i.e. heat exchangers and vapor liquid separator drum, and is then recycled back into the polymerization system.

Higher reactor temperature is a requirement of the present invention and is important in producing the inventive vinyl unsaturation content. Reactor temperatures of at least 205° C. yielded a product having at 300 vinyl unsaturations per one million carbon atoms and having at least a 10% increase in melt strength in comparison to copolymers produced at temperatures below 205° C. while maintaining ethylene conversion in comparison to reaction temperatures below 205° C.

In a particular embodiment of the inventive process, the polymerization step is conducted in a single stage solution reactor.

In one embodiment, the inventive process may be conducted utilizing a multi-constituent catalyst composition, as described herein, suitable for (co)polymerizing ethylene and one or more α-olefin comonomers, e.g. 1-octene, via a solution phase polymerization process in a loop reactor in accordance with the following procedure. All raw materials (ethylene, 1-octene) and the process solvent (an isoparaffinic solvent, for example ISOPAR E) are purified with molecular sieves before introduction into the reaction environment. Hydrogen is supplied as a high purity grade and is not further purified. The reactor monomer feed (ethylene) stream is pressurized via a mechanical compressor to a pressure that is above the reaction pressure, e.g. 750 psig. The solvent and comonomer (1-octene) feed is pressurized via a mechanical positive displacement pump to a pressure that is above the reaction pressure, e.g. 750 psig. The individual catalyst components are manually batch diluted to specified component concentrations with purified solvent (ISOPAR E) and pressured to a pressure that is above the reaction pressure, e.g. 750 psig. All reaction feed flows are measured with mass flow meters and independently controlled with computer automated valve control systems.

The continuous solution polymerization reactor may consist of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at, for example, two locations roughly with equal reactor volumes between each injection location. The fresh feed is controlled typically with each injector, for example, receiving half of the total fresh feed mass flow. The catalyst components are injected into the polymerization reactor through, for example, a specially designed injection inlet device and are combined into one mixed procatalyst/cocatalyst feed stream prior to injection into the reactor. The procatalyst component feed is computer controlled to maintain the reactor monomer concentration at a specified target. The cocatalyst component is fed based on calculated specified molar ratios to the procatalyst component. Immediately following each fresh injection location (either feed or catalyst), the feed streams are mixed with the circulating polymerization reactor contents with static mixing elements such as Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop can be provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as antioxidants can be added at this point. The stream then goes through another set of static mixing elements such as Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a two stage separation and devolatilization system where the polymer is removed from the solvent, hydrogen, and unreacted monomer and comonomer. Impurities are removed from the recycled before entering the reactor again. The separated and devolatilized polymer melt is, for example, pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

In one embodiment, the inventive process may be conducted using a multi-constituent catalyst system, as described herein, suitable for (co)polymerizing ethylene and one or more α-olefin comonomers, e.g. 1-octene, via a solution phase polymerization process in two adiabatic spherical reactors, linked together in series in accordance to the following procedure. The ethylene monomer, 1-octene comonomer, and hydrogen are combined with a solvent, e.g. an isoparaffinic solvent such as ISOPAR E. Impurities such as water, carbon dioxide, sulfurous compounds are removed from the feed streams, and the feed streams are cooled to temperature in the range of 5° C. to 60° C., for example, approximately 13° C., before entering the reactor. The majority, approximately from 85 to 90 percent, of the reaction may occur in the first spherical reactor. The mixing may be achieved via circulating the polymer/procatalyst/cocatalyst/solvent/ethylene/co-monomer/hydrogen solution with one or more agitators equipped with mixing blades. The feed (ethylene/comonomer/solvent/hydrogen) may, for example, enter the reactor from the bottom and the procatalyst/cocatalyst may, for example, enter the reactor separately from the feed and also from the bottom. The first reactor temperature is in the range of from 205° C. to 240° C., for example, approximately 175° C., and the reactor pressure is in the range of from 400 psi to 1000 psi, for example, approximately 500 psi. The temperature of the second reactor, in series with the first, increases to a temperature in the range of from 205° C. to 240° C., for example, approximately 202° C. with approximately from 10 to 15 percent of the remaining reaction occurring and no additional catalyst or monomers are added. Procatalyst/Co-catalyst Al/Ti molar feed ratio is set at value in the range of 0.5:1 to 3:1. The average reactor residence time is in the range of from 2 to 30 minutes, for example, approximately 8 minutes per spherical reactor prior to termination post-reactor by a fluid specially designed for that purpose. After the polymer solution leaves the reactor, the solvent with unconverted ethylene monomer and 1-octene comonomer may be removed from the polymer solution via a two stage devolatilizer system, and then recycled. Impurities may be removed from the recycled stream before entering the reactor again. The polymer melt may, for example, be pumped through a die specially designed for underwater pelletization. The pellets are transferred to classifier screens to remove over and undersize particles. The finished pellets are then transferred to storage devices.

In some embodiments of the inventive process, a primary antioxidant is added after to the polymerization reactor product after such product is removed from the reactor and before the product is heated by post reactor heaters ("post-reactor"). Examples of suitable primary antioxidants for use in embodiments of the inventive process include hindered phenolics (e.g., IRGANOX 1010, available from BASF).

Some embodiments of the inventive process further include adding a secondary antioxidant to the post-reactor. Examples of suitable secondary antioxidants for use in embodiments of the inventive process include phosphites (e.g., IRGAFOS 168, available from BASF).

The invention further provides a process according to any of the foregoing embodiments wherein the enhanced melt strength ethylene/α-olefin copolymer has a melt strength improved by at least 10% relative to an ethylene/α-olefin copolymer having substantially the same ethylene/α-olefin content and $I_2$ of the enhanced melt strength ethylene/α-olefin copolymer but produced in a temperature in the range of less than 205° C. in the presence of at least 1.8 times the amount of antioxidant used in preparing the enhanced melt strength ethylene/α-olefin copolymer and having less than 300 vinyl unsaturation units per 1,000,000 carbon atoms.

Multi-Constituent Catalyst

The multi-constituent catalyst system includes a Ziegler-Natta catalyst composition including a magnesium and titanium containing procatalyst and a cocatalyst. The procatalyst is a Ziegler Natta catalyst including a titanium compound supported on $MgCl_2$. The cocatalyst is a triethylaluminum (TEA). The procatalyst may have a Ti:Mg ratio between 1.0:40 to 5.0:40, for example, 3.0:40. The procatalyst and the cocatalyst components can be contacted either before entering the reactor or in the reactor. The procatalyst may, for example, be any other titanium based Ziegler Natta catalyst. The Al:Ti molar ratio of cocatalyst component to procatalyst component can be from 0.5:1 to 10:1, for example 3:1.

The multi-constituent catalyst system includes a Ziegler-Natta catalyst composition including a magnesium and titanium containing procatalyst and a cocatalyst. The procatalyst may, for example, comprise the reaction product of magnesium dichloride, an alkylaluminum dihalide, and a titanium alkoxide. The procatalyst may comprise the reaction product of:

(A) a magnesium halide prepared by contacting:
(1) at least one hydrocarbon soluble magnesium component represented by the general formula R"R'Mg.x-AlR'3 wherein each R" and R' are alkyl groups;
(2) at least one non-metallic or metallic halide source under conditions such that the reaction temperature does not exceed a temperature in the range of from 20 to 40, for example, it does not exceed about 40° C.; or in the alternative, it does not exceed about 35° C.;

(B) at least one transition metal compound represented by the formula Tm(OR)y Xy−x wherein Tm is a metal of Groups IVB, VB, VIB, VIIB or VIII of the Periodic Table; R is a hydrocarbyl group having from 1 to about 20, for example from 1 to about 10 carbon atoms; X is a halide, and y and x are integers and their sum is equal to 4, and (C) an additional halide source to provide the desired excess X:Mg ratio; wherein additional halide source may be an organo halide compound of Group IIIA metal including, for example, those represented by the formula $R'_yMX_z$; wherein M is a metal from Group IIIA of the Periodic Table of Elements, for example aluminum or boron; each R' is independently an alkyl group having from 1 to 20, for example from 1 to 10, or in the alternative, from 2 to 8, carbon atoms; X is a halogen atom, for example chlorine; y and z each independently have a value from 1 to a value equal to the valence of M. Particularly suitable organo halide compounds include, for example, ethylaluminum dichloride, ethylaluminum sequichloride; diethylaluminum chloride; isobutylaluminum dichloride; diisobutylaluminum chloride; octylaluminum dichloride; and combinations of 2 or more thereof.

Particularly suitable transition metal compounds include, for example, titanium tetrachloride, titanium trichloride, tetra(isopropoxy)-titanium, tetrabutoxytitanium, diethoxytitanium dibromide, dibutoxytitanium dichloride, tetraphenoxytitanium, tri-isopropoxy vanadium oxide, zirconium tetra-n-propoxide, mixtures thereof and the like.

Other suitable titanium compounds which can be employed as the transition metal component herein include at least one titanium compound represented by the formula Ti(OR)x X4−x wherein each R is independently a hydrocarbyl group having from 1 to about 20, for example from about 1 to about 10, or in the alternative, from about 2 to about 4 carbon atoms; X is a halogen and x has a value from zero to 4.

The foregoing procatalyst components are combined in proportions sufficient to provide atomic ratios as previously mentioned.

The foregoing pro-catalytic reaction product is prepared in the presence of an inert diluent. The concentrations of catalyst components are such that when the essential components of the catalytic reaction product are combined, the resultant slurry is from about 0.005 to about 1.0 molar (moles/liter) with respect to magnesium. Exemplary suitable inert organic diluents include, but are not limited to, liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, and naphthas. Exemplary suitable inert organic diluents are free of any olefin compounds and other impurities. Exemplary suitable inert organic diluents have boiling points in the range of from −50° C. to 200° C. Mixing of the procatalyst components to provide the desired catalytic reaction product is advantageously prepared under an inert atmosphere such as nitrogen, argon or other inert gas at temperatures in the range of from 10° C. to 50° C.; for example, from 20° C. to 40° C., provided that the magnesium halide support is prepared such that the reaction temperature does not exceed 35° C. In the preparation of the catalytic reaction product, it is not necessary to separate hydrocarbon soluble components from hydrocarbon insoluble components of the reaction product.

The procatalyst composition serves as one component of a Ziegler-Natta catalyst composition, in combination with a cocatalyst. The cocatalyst is employed in a molar ratio based on titanium in the procatalyst of from 1:1 to 100:1; for example, in a molar ratio in the range of from 0.5:1 to 3:1.

In an alternative embodiment, the instant invention further provides an enhanced melt strength ethylene/α-olefin copolymer produced according to any of the foregoing inventive processes.

The inventive ethylene/α-olefin copolymer may comprise from 10 to 50 percent by weight of units derived from one or more α-olefin comonomers. All individual values and subranges from 10 to 50 weight percent are included herein and disclosed herein; for example, the inventive ethylene/α-olefin copolymer can be from a lower limit of 10, 20, 30, or 40 percent by weight of units derived from one or more α-olefin comonomers to an upper limit of 20, 30, 40 or 50 percent by weight of units derived from one or more α-olefin comonomers. For example, the weight percent of units derived from one or more α-olefin comonomers in the inventive ethylene/α-olefin copolymer may be in the range of from 10 to 50, or in the alternative, the weight percent of units derived from one or more α-olefin comonomers in the inventive ethylene/α-olefin copolymer may be in the range of from 20 to 40, or in the alternative, the weight percent of units derived from one or more α-olefin comonomers in the inventive ethylene/α-olefin copolymer may be in the range of from 30 to 40.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be selected, for example, from the group consisting of propylene, 1-butene, 1-hexene, and 1-octene; or in the alternative, from the group consisting of 1-hexene and 1-octene.

The enhanced melt strength ethylene/α-olefin copolymer may have a melt strength of at least 3.0 cN. All individual values and subranges of at least 3.0 cN are included herein and disclosed herein. For example the enhanced melt strength ethylene/α-olefin copolymer may have a melt strength of at least 3.0 cN, or in the alternative, the enhanced melt strength ethylene/α-olefin copolymer may have a melt strength of at least 3.05 cN, or in the alternative, the enhanced melt strength ethylene/α-olefin copolymer may have a melt strength of at least 3.08 cN, or in the alternative, the enhanced melt strength ethylene/α-olefin copolymer may have a melt strength of at least 3.1 cN, or in the alternative, the enhanced melt strength ethylene/α-olefin copolymer may have a melt strength of at least 3.12 cN.

In an alternative embodiment, the instant invention provides a blend comprising the enhanced melt strength ethylene/α-olefin copolymer produced according to the inventive process and at least one second polymer selected from the group consisting of synthetic and natural polymers. Exemplary synthetic polymers useful in the inventive blend include low density polyethylene. Such low density polyethylene composition may have a density in the range of from 0.91 g/cm³ to 0.94 g/cm³; for example, from 0.915 g/cm³ to 0.935 g/cm³, and a melt index ($I_2$) in the range of from 0.1 to 5 g/10 minutes; for example, from 0.2 to 2g/10 minutes. The blend may have a density in the rage of from 0.91 g/cm³ to 0.94 g/cm³; for example, from 0.915 g/cm³ to 0.935 g/cm³, and a melt index ($I_2$) in the range of from 0.05 to 5 g/10 minutes; for example, from 0.1 to 2 g/10 minutes.

The inventive ethylene/alpha-olefin copolymer may be blended with one or more additives. Such additives include, but are not limited to, antistatic agents, color enhancers, dyes, lubricants, fillers, pigments, primary antioxidants, secondary antioxidants, processing aids, UV stabilizers, and combinations thereof. The blend of the inventive ethylene/α-olefin copolymer with one or more additives may contain any amounts of additives. The blend of the inventive ethylene/α-olefin copolymer and one or more additives may compromise from about 0 to about 10 percent by the combined weight of such additives, based on the weight of the inventive ethylene/α-olefin copolymer and the one or more additives.

Film Application

In application, the ethylene/α-olefin copolymer or blend thereof with one or more other polymers, for example LDPE, made by the inventive process may be used to manufacture films. Such films may include, but are not limited to, clarity shrink films, collation shrink films, cast stretch films, silage films, stretch hooder films, sealants, stand up pouch films, liner films, machine direction oriented films, and diaper backsheets. Different methods may be employed to manufacture such films. Suitable conversion techniques include, but are not limited to, blown film process, cast film process, tenter frame process, double bubble process, such as partially crosslinked or non-crosslinked, vertical or horizontal form fill and seal process. Such techniques are generally well known. In one embodiment, the conversion technique includes, but is not limited to, the blown film process.

The films according to the present invention may include at least one film layer, such as a monolayer film, or at least one layer in a multilayer film prepared by cast, blown, calendered, or extrusion coating processes. The inventive ethylene/α-olefin copolymer or blend thereof with one or more other polymers, for example LDPE, may be used in a variety of films, including but not limited to clarity shrink films, collation shrink films, cast stretch films, silage films, stretch hooder films, sealants, stand up pouch films, liner films, machine direction oriented films, and diaper backsheets.

EXAMPLES

The following examples illustrate the present invention but are not intended to limit the scope of the invention.

Preparation of Inventive Examples 1 and 2 and Comparative Examples 1 and 2

All raw materials (ethylene, 1-octene) and the process solvent (an isoparaffinic solvent under the tradename ISOPAR E, which is commercially available from Exxon-Mobil Corporation) were purified with molecular sieves before introduction into the reaction environment. Hydrogen was supplied in pressurized cylinders as a high purity grade and was not further purified. The reactor monomer feed (ethylene) stream was pressurized via a mechanical compressor to a pressure that was above the reaction pressure, e.g. 750 psig. The solvent and comonomer (1-octene) feed was pressurized via a mechanical positive displacement pump to pressure that was above the reaction pressure, e.g. 750 psig. The individual catalyst components were manually batch diluted to specified component concentrations with purified solvent (ISOPAR E) and pressured to a pressure that was above the reaction pressure, e.g. 750 psig. The catalyst used in preparing the Inventive and Comparative Examples was a Ziegler-Natta catalyst having a Ti to Mg molar ratio of 3 to 40 (designated in Table 1 as ZN-1). The co-catalyst was triethylaluminum (TEA). The same catalyst and co-catalyst compositions were used in preparing each of the Inventive and Comparative Examples. All reaction feed flows were measured with mass flow meters and independently controlled with computer automated valve control systems.

The continuous solution polymerization reactor consists of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at two locations roughly with equal reactor volumes between each injection location. The fresh feed is controlled typically with each injector receiving half of the total fresh feed mass flow. The catalyst components are injected into the polymerization reactor through a specially designed injection inlet device and are combined into one mixed procatalyst/cocatalyst feed stream prior to injection into the reactor. The cocatalyst component is fed based on calculated specified molar ratios to the procatalyst component. Immediately following each fresh injection location (either feed or catalyst), the feed streams are mixed with the circulating polymerization reactor contents with Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as antioxidants can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve (responsible for maintaining the pressure of the reactor at a specified target). The stream then enters a two stage separation and devolatilization system where the polymer is removed from the solvent, hydrogen, and unreacted monomer and comonomer. Impurities are removed from the recycled stream before entering the reactor again. The separated and devolatilized polymer melt is pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. The recycled solvent can still have unreacted co-monomer in it that is fortified with fresh co-monomer prior to re-entry to the reactor. The recycled solvent can still have some hydrogen which is then fortified with fresh hydrogen.

Table 1 summarizes conditions for polymerization of the Inventive and Comparative Examples. Antioxidants used in the Inventive Examples 1-2 and Comparative Examples 1-2 are indicated in Table 1.

TABLE 1

|  | Comparative Example 1 | Comparative Example 2 | Inventive Example 1 | Inventive Example 2 |
|---|---|---|---|---|
| Reactor Conditions |  |  |  |  |
| Catalyst | ZN-1 | ZN-1 | ZN-1 | ZN-1 |
| Co-Catalyst | TEA | TEA | TEA | TEA |
| Al/Ti | 1.5 | 3 | 3 | 3 |
| Ethylene Conversion | 93.6 | 93.2 | 93.2 | 93.1 |
| Comonomer Type | 1-Octene | 1-Octene | 1-Octene | 1-Octene |
| Reactor Polymer Concentration (wt %) | 22.3 | 21.8 | 21.9 | 21.8 |
| Reactor Temperature, ° C. | 175 | 193 | 210 | 210 |
| Reactor Pressure, psi | 725 | 725 | 725 | 725 |
| $H_2$ level, mole % | 0.2220 | 0.0754 | 0.0240 | 0.0243 |
| Antioxidant added post-reactor |  |  |  |  |
| IRGANOX-1010, ppm | 193 | 194 | 193 | 107 |
| IRGANOX-1076, ppm | 259 | 258 | 258 | 120 |
| IRGOFAS-168, ppm | 1051 | 1044 | 1047 | 503 |
| IRGOFAS-168 oxide, ppm | 0 | 0 | 0 | 0 |

TABLE 1-continued

|  | Comparative Example 1 | Comparative Example 2 | Inventive Example 1 | Inventive Example 2 |
|---|---|---|---|---|
| IRGOFAS-168 total, ppm | 1051 | 1044 | 1047 | 503 |

Characterization of Comparative Examples 1 and 2 and Inventive Examples 1-3

Properties of the ethylene/α-olefin copolymers of Comparative Examples 1 and 2 and Inventive Examples 1-3 are reported in Table 2 and FIG. 1.

The densities of the Inventive and Comparative Examples do not substantially differ. Likewise, the melt index, $I_2$, of each of Comparative Example 2 and Inventive Examples 1-3 do not substantially differ. The amount of vinyl unsaturations per million carbon atoms in the ethylene/α-olefin copolymer of Comparative Example 2 is greater than that of Comparative Example 1 but yet falls outside the inventive vinyl unsaturation range. Each of Inventive Examples 1 and 2 were produced at reactor temperatures equal to or greater than 205° C. and each of the Inventive Examples 1-2 exhibit an increase in melt strength of at least 10% over Comparative Example 2. In Table 2 below, Melt Strength Enhancement, % Change, is calculated in comparison to the average melt strength of Comparative Example 2. Inventive Example 3 was an ethylene/octene copolymer, produced using a Ziegler-Natta catalyst, obtained from Nova Chemicals under the name SCLAIR FP120C.

TABLE 2

|  | Comparative Example 1 | Comparative Example 2 | Inventive Example 1 | Inventive Example 2 | Inventive Example 3* |
|---|---|---|---|---|---|
| Ethylene/α-olefin copolymer properties |  |  |  |  |  |
| Density, g/cc | 0.9190 | 0.9220 | 0.9210 | 0.9220 | 0.9214 |
| $I_2$ at 190° C., 2.16 kg, g/10 min | 1.34 | 0.98 | 0.97 | 1.00 | 0.99 |
| $I_{10}/I_2$ | 6.97 | 7.73 | 8.35 | 8.03 | 7.92 |
| Cold probe NMR unsaturation analysis |  |  |  |  |  |
| Vinylene per million C atoms | 21 | 33 | 50 | 53 | 66 |
| Trisubstitute per million C atoms | 6 | 7 | 11 | 14 | 12 |
| Vinyl per million C atoms | 165 | 267 | 342 | 336 | 381 |
| Vinylidene per million C atoms | 41 | 49 | 61 | 61 | 65 |
| Total | 233 | 356 | 464 | 464 | 524 |
| Average Melt Strength, cN | 2.32 | 2.80 | 3.17 | 3.13 | 3.38 |
| Melt Strength Enhancement, % Change** | −17.2% | — | 13.0% | 11.7% | 20.6% |
| GPC data |  |  |  |  |  |
| Mn, g/mole | 28,904 | 30,733 | 29,594 | 26,728 | 25,674 |
| Mw, g/mole | 106,811 | 116,819 | 115,493 | 115,004 | 106,033 |
| Mz, g/mole | 265,376 | 326,599 | 333,331 | 338,586 | 310,399 |
| Peak Molecular Weight, g/mole | 69,459 | 65,856 | 63,449 | 63,308 | 63,792 |

TABLE 2-continued

|  | Comparative Example 1 | Comparative Example 2 | Inventive Example 1 | Inventive Example 2 | Inventive Example 3* |
|---|---|---|---|---|---|
| Mw/Mn | 3.70 | 3.80 | 3.90 | 4.30 | 4.13 |
| Mz/Mw | 2.48 | 2.80 | 2.89 | 2.94 | 2.93 |
| Viscosity Information | | | | | |
| Viscosity at 0.1 rad/s (V0.1), Pa-s | 5,972 | 8,263 | 8,755 | 8,603 | 8,420 |
| Viscosity at 100 rad/s (V100), Pa-s | 1,579 | 1,659 | 1,549 | 1,549 | 1,585 |
| V0.1/V100 | 3.78 | 4.98 | 5.65 | 5.56 | 5.31 |
| Tan(δ) at 0.1 rad/s (T0.1) | 18.25 | 11.82 | 9.41 | 9.64 | 8.93 |
| Tan(δ) at 100 rad/s (T100) | 1.15 | 1.04 | 1.02 | 1.02 | 1.03 |
| T0.1/T100 | 15.91 | 11.35 | 9.26 | 9.46 | 8.66 |

TEST METHODS

Test methods include the following:

Density

Samples for density measurements were prepared according to ASTM D 4703-10. Samples were pressed at 374° F. (190° C.) for five minutes at 10,000 psi (68 MPa). The temperature was maintained at 374° F. (190° C.) for the five minutes, and then the pressure was increased to 30,000 psi (207 MPa) for three minutes. This was followed by a one minute hold at 70° F. (21° C.) and 30,000 psi (207 MPa). Density measurements were made within one hour of sample pressing using ASTM D792-08, Method B.

Samples for density measurements were prepared according to ASTM D 4703-10.

Melt Index

Melt index, $I_2$, was measured in accordance with ASTM D 1238-10, Condition 190° C./2.16 kg, and is reported in grams eluted per 10 minutes (g/10 min). The $I_{10}$ was measured in accordance with ASTM D 1238, Condition 190° C/10 kg, and is reported in g/10 min.

$^1$H NMR Method 3.26 g of stock solution was added to 0.133 g of polyolefin sample in a 10 mm NMR tube. The stock solution is a mixture of tetrachloroethane-d2 (TCE) and perchloroethylene (50:50, weight:weight). The solution in the tube was purged with $N_2$ for 5 minutes to reduce the amount of oxygen. The capped sample tube was left at room temperature overnight to swell the polymer sample. The sample was dissolved at 110° C. with shaking. The samples were free of the additives that may contribute to unsaturation, e.g. slip agents such as erucamide. $^1$H NMR experiment was performed on a Bruker AVANCE 400 MHz spectrometer equipped with a Bruker Dual DUL high-temperature cryoprobe and at a sample temperature of 120° C. Two experiments were run with each sample to obtain the results, a control spectrum to quantify the total polymer protons, and a double presaturation experiment, which suppresses the intense polymer peaks and enables high sensitivity spectrum for quantitation of the unsaturation. The control was run with ZG pulse, 4 scans, SWH=10,000 Hz, AQ=1.64 s, $D_1=5*T_1$, where $T_1$ is the spin-lattice relaxation time. The double presaturation experiment was run with a modified pulse sequence, 1c1prf2_zz, TD=32768, 100 scans, DS=4, SWH=10,000 Hz, AQ=1.64 s, $D_1=1$ s, $D_{13}=13$ s, $D_1+D_{13}\geq5\cdot T_1$. The 1c1prf2_zz pulse sequence is shown in the Table 3.

TABLE 3

```
prosol relations=<lcnmr>
#include <Avance.incl>
"d12=20u"
"d11=4u"
1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
Exit
ph1=0 2 2 0 1 3 3 1
ph29=0
ph31=0 2 2 0 1 3 3 1
```

Gel Permeation Chromatography (GPC)

For gel permeation chromatography (GPC) measurements, the chromatographic system consisted of a Polymer Laboratories Model PL-220. The column and carousel compartments were operated at 140° C. Three Polymer Laboratories 10-μm Mixed-B columns were used with a solvent of 1,2,4 trichlorobenzene. The samples were prepared at a concentration of 0.1 g of polymer in 50 ml of solvent. The solvent used to prepare the samples contained 200 ppm of the antioxidant butylated hydroxytoluene (BHT). Samples were prepared by agitating lightly for 4 hours at 160° C. The injection volume used was 100 microliters and the flow rate was 1.0 ml/min. Calibration of the GPC column set was performed with narrow molecular weight distribution polystyrene standards purchased from Polymer Laboratories. The polystyrene standard peak molecular weights were converted to polyethylene molecular weights using the method of Williams and Ward:

$$M_{polyethylene}=A(M_{polystyrene})^B$$

in which M is the molecular weight, A has a value of 0.4316 and B is equal to 1.0. Polyethylene equivalent molecular weight calculations were performed using Viscotek TriSEC software Version 3.0. Williams, T., and Ward, I. M., "The Construction of Polyethylene Calibration Curve for Gel Permeation Chromatography Using Polystyrene Fractions", *J. Polym. Sci. Polym. Lett.*, 6, 621 (1968).

The average molecular weight calculations of Mw and Mn (weight-average, and number-average molecular weight for polyethylene) were based on the following equations using the above Williams and Ward polyethylene calibration method. The mathematical summation in the equations was done across the different elution slices of the GPC elution curve. The polydispersity of polymer molecular weight distribution was calculated as the ratio of Mw over Mn (Mw/Mn).

$$\overline{Mw} = \frac{\sum_{i}^{i}(RI_i * M_{calibration_i})}{\sum_{i} RI_i}$$

$$\overline{Mn} = \frac{\sum_{i}^{i} RI_i}{\sum_{i}(RI_i / M_{calibration_i})}$$

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips located 100 mm below the die, with an acceleration of 2.4 mm/s². The tensile force was recorded as a function of the take-up speed of the nip rolls. The following conditions were used in the melt strength measurements: plunger speed=0.265 mm/second; wheel acceleration=2.4 mm/s²; capillary diameter=2.0 mm; capillary length=30 mm; and barrel diameter=12 mm. Melt strength was reported as the plateau force (cN) before the strand broke. Average melt strength was determined by fitting a force (F) versus velocity (v) curve to the following expression:

$$F = D + [(A-D)/(1+(C \cdot v)^B)]$$

where: A=the average melt strength in cN; B=the onset slope; C=characteristic velocity (s/mm); and D=offset (cN).

Dynamic Mechanical Spectroscopy (DMS)

Resins were compression-molded into "3 mm thick×1 inch" circular plaques at 350° F. (177° C.) for five minutes, under 1500 psi pressure in air. The sample was then taken out of the press, and placed on the counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate is removed), and then the test was started. The method had an additional five minute delay built in, to allow for temperature equilibrium. The experiments were performed at 190° C. over a frequency range of 0.1 to 100 rad/s. The strain amplitude was constant at 10%. The stress response was analyzed in terms of amplitude and phase, from which the storage modulus (G'), loss modulus (G''), complex modulus (G*), complex viscosity η*, tan (δ) or tan delta, viscosity at 0.1 rad/s (V0.1), the viscosity at 100 rad/s (V100), and the viscosity ratio (V0.1/V100) were calculated.

We claim:

1. An ethylene/α-olefin copolymer comprising:
   units derived from ethylene; and
   units derived from at least one α-olefin;
   wherein the ethylene/α-olefin copolymer has a density in the range of from 0.90 to 0.94 g/cc; a melt index ($I_2$) in the range of from 0.05 to 50 dg/min; a Mw/Mn of from 3 to 5; and from 300 to 350 vinyl unsaturations per 1,000,000 carbon atoms in the ethylene/α-olefin copolymer; and a melt strength of at least 3.0 cN measured via capillary rheometer at a standard test temperature of 190° C.

2. A process for producing an ethylene/α-olefin copolymer comprising the steps of:
   (1) polymerizing ethylene and one or more α-olefins in a polymerization reactor wherein the ethylene/α-olefin copolymer is produced using a polymerization step occurring at a temperature of at least 205° C. in the presence of a multi-constituent catalyst system comprising a Ziegler-Natta catalyst composition including a magnesium and titanium containing precatalyst and a cocatalyst, wherein said precatalyst has a Ti:Mg ratio between 1.0:40 to 5.0:40 and in the presence of hydrogen from 0.01 to 0.04 mole percent;
   (2) thereby producing an enhanced melt strength ethylene/α-olefin copolymer having from 300 to 350 vinyl unsaturation units per 1,000,000 carbon atoms, a density in the range of from 0.90 to 0.94 g/cc; a melt index ($I_2$) in the range of from 0.05 to 50 dg/min; and a Mw/Mn of from 3 to 5; and a melt strength of at least 3.0 cN measured via capillary rheometer at a standard test temperature of 190° C.

3. The process according to any one of claim 2, wherein the polymerization step occurs in the presence of hydrogen from 0.015 to 0.03 mole percent.

4. The process according to claim 2, wherein the polymerizing step occurs in a single stage solution reactor.

5. The process according to claim 2, further comprising adding a primary antioxidant to a product stream produced in the polymerizing step postreactor.

* * * * *